(12) United States Patent
Motes, III et al.

(10) Patent No.: US 11,933,749 B2
(45) Date of Patent: Mar. 19, 2024

(54) NONDESTRUCTIVE SENSING DEVICE AND METHOD FOR INSPECTION AND MEASURING THE CLEANLINESS OF COMPOSITE SURFACES COUPLED WITH METHODS FOR REMOVING CONTAMINANTS AND ACTIVATING THE COMPOSITE SURFACES

(71) Applicant: Texas Research International, Inc., Austin, TX (US)

(72) Inventors: Doyle T. Motes, III, Austin, TX (US); Marcus Keiser, Cedar Park, TX (US); Richard Piner, Austin, TX (US)

(73) Assignee: Texas Research International, Inc, Austin, TX (US)

( * ) Notice: Subject to any disclaimer, the term of this patent is extended or adjusted under 35 U.S.C. 154(b) by 392 days.

(21) Appl. No.: 17/472,533

(22) Filed: Sep. 10, 2021

(65) Prior Publication Data
US 2022/0136986 A1    May 5, 2022

Related U.S. Application Data

(60) Provisional application No. 63/077,263, filed on Sep. 11, 2020.

(51) Int. Cl.
*G01N 23/22* (2018.01)
*G01N 23/2202* (2018.01)
*G01N 23/225* (2018.01)

(52) U.S. Cl.
CPC ....... *G01N 23/2202* (2013.01); *G01N 23/225* (2013.01)

(58) Field of Classification Search
CPC ........................ G01N 23/2202; G01N 23/225
USPC ................................................. 250/306, 307
See application file for complete search history.

(56) References Cited

U.S. PATENT DOCUMENTS

| | | | | |
|---|---|---|---|---|
| 3,997,779 | A * | 12/1976 | Rabl ....................... | H01J 43/30 250/207 |
| 6,208,091 | B1 * | 3/2001 | Beeteson ................ | H01J 61/56 315/366 |
| 2004/0031936 | A1 * | 2/2004 | Oi ......................... | H01J 37/244 250/311 |

OTHER PUBLICATIONS

Li S, Sun T, Liu C, Yang W, Tang Q. 2018 "A study of laser surface treatment in bonded repair of composite aircraft structures," R.Soc. opensci.5:171272. URL: http://dx.doi.org/10.1098/rsos.171272.
H. Dittmar, F. Gäbler, U. Stute, "UV-laser ablation of fibre reinforced composites with ns-pulses," Lasers in Manufacturing Conference 2013, Physics Procedia 41, 2013 (pp. 266-275).
F. L. Palmieri, J. Hopkins, C. J. Wohl, Y. Lin, J. W. Connell, M. A. Belcher and . Y. Blohowiak, "Laser Surface Preparation of Epoxy Composites for Secondary Bonding: Optimization of Ablation Depth". URL https://ntrs.nasa.gov/archive/nasa/casi.ntrs.nasa.gov/20160005971.pdf.
R. I. Ledesma, F. L. Palmieri, W. T. Yost, J. W. Connell, and J. M. Fitz-Gerald, "Surface Monitoring of CFRP Structures for Adhesive Bonding," URL: https://ntrs.nasa.gov/archive/nasa/casi.ntrs.nasa.gov/20170002059.pdf.

(Continued)

*Primary Examiner* — Nicole M Ippolito
(74) *Attorney, Agent, or Firm* — M. A. Ervin & Associates; Michael A. Ervin

(57) ABSTRACT

Non-destructive sensing methods and devices for inspection and measuring in manufacturing applications for removal of contaminants from composite surfaces coupled with sensing and activation of the composite surfaces.

22 Claims, 3 Drawing Sheets

(56) References Cited

OTHER PUBLICATIONS

Rudolf Weber, Margit Hafner, Andreas Michalowski, and Thomas Graf, "Minimum Damage in CFRP Laser Processing," Physics Procedia 12, 2011 (pp. 302-307).
R. I. Ledesma, W. T. Yost, F. L. Palmieri, and J. W. Connell, "Optically stimulated electron emission analysis of surface contamination levels on epoxy composites and effect on failure mode of adhesively bonded specimens" AIP Conference Proceedings 2102, 070005 (2019); https://doi.org/10.1063/1.5099805 Published Online: May 8, 2019.
Wolf, R.A., "Atmospheric pressure plasma for surface modification", Scrivener Publishing LLC (2013).

* cited by examiner

NONDESTRUCTIVE SENSING DEVICE AND METHOD FOR INSPECTION AND MEASURING THE CLEANLINESS OF COMPOSITE SURFACES COUPLED WITH METHODS FOR REMOVING CONTAMINANTS AND ACTIVATING THE COMPOSITE SURFACES

STATEMENT OF RIGHTS TO INVENTION MADE UNDER FEDERALLY SPONSORED RESEARCH

This invention was made with government support under the Small Business Innovative Research (SBIR) Program, Topic Number AF191-097 contract number FA86590-19-P-5161 awarded by the Air Force Research Laboratory Materials and Manufacturing Directorate. The government has certain rights in the invention.

FIELD

Manufacturing systems for removal of contaminants from composite surfaces coupled with sensing and activation of the composite surfaces.

BACKGROUND

Carbon fiber reinforced polymer (CFRP) composite materials have become important structural materials for many different applications from advanced aircraft to tennis rackets. One of the issues involved in constructing large assemblies from composites is the joining of two composite parts together. Traditional joining methods for metallic components, such as welding, nuts and bolts, clamps, etc., present special challenges when used with composite materials. In many cases, an adhesively bonded joint may be a more efficient design solution. As a result, many manufacturers have turned to using high strength adhesives to join different composite pieces together, which are most efficient from a joint design standpoint. This avoids heat or stress concentrations; however, the strength of the bond is limited by the adhesive bond strength. Modern adhesives are strong enough to achieve the task, but only work if the composite surface is clean, dry, and properly activated to ensure the maximum number of C—OH, C—COOH and C=O groups are available to participate in bonding. Contamination on the bond faying surfaces may weaken the bond and lead to premature failure. Successfully cleaning the surface prior to bonding is critical. Any method used to prepare the surface must be reliable and reproducible. Historically, sanding or sand blasting are the most popular means to prepare surfaces, as the abrasion marks are clearly visible. Although this method provides a simple solution, it can lead to grit being embedded in the bonding surface of the composite, as well as generating excess dust and removing a significant amount of the epoxy matrix as well. Oftentimes, the sanding is performed manually, leading to the sanding process varying significantly depending on the operator. Parameters such as pressure, speed, the condition of the sandpaper, etc. can all affect the quality of the surface being bonded. This has led to industry moving to using composites covered with peel ply. The ply is removed from the surface just before bonding. This should leave a clean dry surface but can lead to other problems. If the peel ply is not clean, it will leave contaminants on the surface. It can also leave pieces of the peel ply stuck to the surface. In addition, the surface may not be chemically active and further activation may still be needed.

The use of adhesively bonded joints as an alternative to mechanically fastened joints provides many advantages, including lower structural weight, lower fabrication cost, and improved damage tolerance. Bond surfaces may go through sanding, plasma, or laser treatments prior to bonding or no preparation if the peel ply is removed just before bonding. However, there are currently no instruments available that can reliably assess the suitability of a surface for subsequent bonding, without touching that surface with liquids or chemicals in a manufacturing environment, i.e. provide process control.

An important need then is the development a combination of a cleaning system, to remove any traces of mold release, and an inspection system to determine if there is any remaining contamination, in particular mold release, present on the composite surfaces. A mold release, or mold release agent is often used in the manufacture of CFRP structures during molding to provide a critical barrier between a molding surface and the substrate, faciliting separation of the cured part from the mold.

Ideally, the inspection would also provide information on the state of the activation of the surface so that the cleaning system could then remove the remaining contamination from the surface. Subsequently, the surface could be inspected again to ensure that the procedure had been performed correctly and the surfaces were ready for bonding. Currently no system exists that can perform all of these needs in a manufacturing environment.

BRIEF SUMMARY

Figure 1:
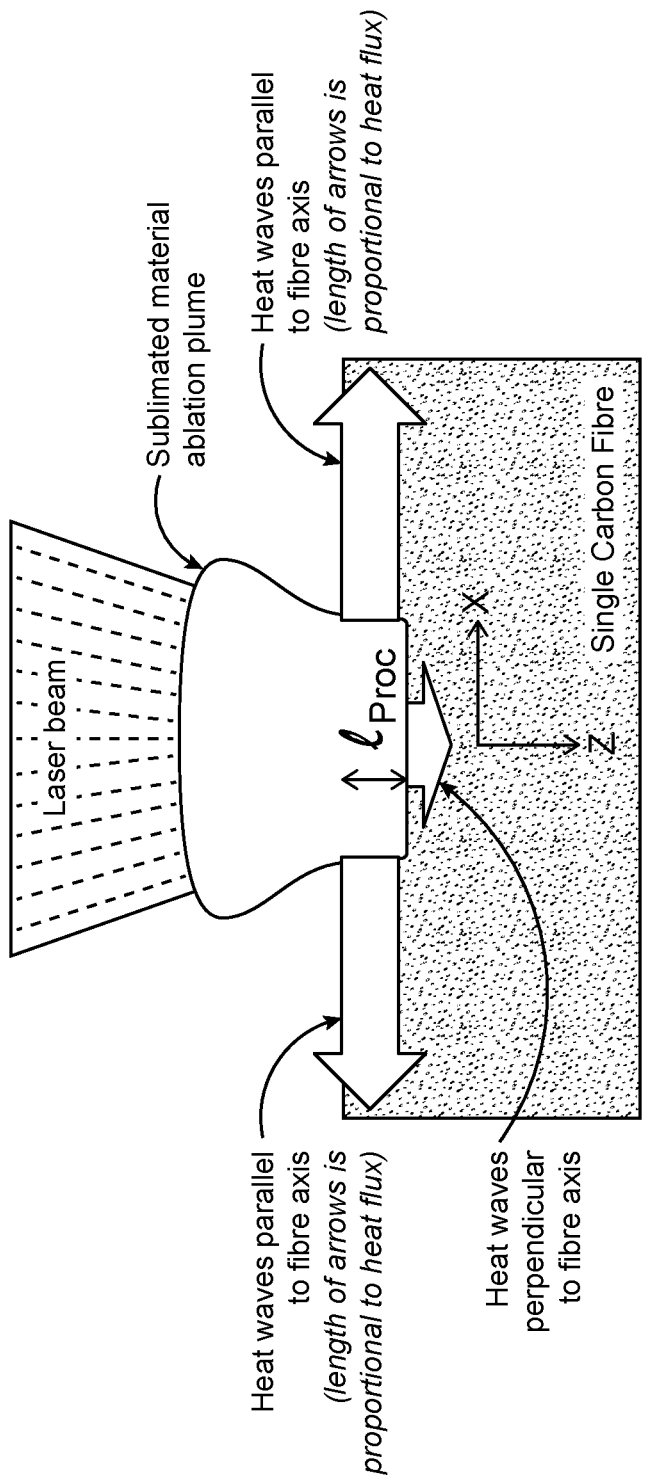
FIG. 1 Thermodynamics of laser ablation

Described herein is an integrated nondestructive sensing device for inspection and measuring the cleanliness of composite surfaces coupled with laser ablation for removing contaminants and activating the composite surfaces including at least: a pulsed laser system to prepare and clean the composite surfaces; a secondary electron sensing system using a short wave ultraviolet light to generate secondary electrons from the composite surfaces to generate a measurable current that is directly proportional to the cleanliness and activation of the surface; wherein the secondary electrons are collected via a mesh collector connected to a virtual ground and the secondary electron current is measured by an ammeter; and wherein the composites surfaces are biased to ground with a negative DC power supply.

Also described herein is an integrated nondestructive sensing method for inspection and measuring the cleanliness of composite surfaces coupled with a laser ablation method for removing contaminants and activating the composite surfaces including at least the steps of: providing a pulsed laser system and using it to prepare and clean the composite surfaces; providing a secondary electron sensing system using a short wave ultraviolet light to generate secondary electrons from the composite surfaces to generate a measurable current that is directly proportional to the cleanliness and activation of the surface; collecting the generated secondary electrons with a mesh collector connected to a virtual ground; measuring the secondary electron current with an ammeter; and biasing the composite surfaces to ground with a negative DC power supply.

Also described herein is an integrated nondestructive sensing device for inspection and measuring the cleanliness of composite surfaces including at least: a secondary electron sensing system using a short wave ultraviolet light to generate secondary electrons from the composite surfaces to generate a measurable current that is directly proportional to the cleanliness and activation of the surface; wherein the secondary electrons are collected via a mesh collector connected to a virtual ground and the secondary electron current is measured by an ammeter; and wherein the composites surfaces are biased to ground with a negative DC power supply.

Also described herein is an integrated nondestructive sensing method for inspection and measuring the cleanliness of composite surfaces including at least: a provided secondary electron sensing system using a short wave ultraviolet light to generate secondary electrons from the composite surfaces to generate a measurable current that is directly proportional to the cleanliness and activation of the surface; wherein the secondary electrons are collected via a mesh collector connected to a virtual ground and the secondary electron current is measured by an ammeter; and wherein the composites surfaces are biased to ground with a negative DC power supply.

DETAILED DESCRIPTION

Disclosed herein is the feasibility of: 1.) certain laser ablation methods as a means of removing contaminants on a composite surface and activating it, and 2.) nondestructive sensing methods for inspecting the surface activation and cleanliness of a composite surface as a means to assess the readiness of the surface for bonding.

Several methodologies were examined for a means to inspect the cleanliness of the composite surface, including IR methods and Raman spectroscopy, neither of which produced useable, unequivocal results. Laser ablation was shown to have potential for cleaning and activating composite surfaces, but only if a "sweet spot" is identified for the composite and laser in terms of the amount of power used and the laser beam wavelength. Incorrect laser wavelengths will not couple energy into the mold-release on the surface that needs to be ablated away (i.e. the mold-release is transparent at certain laser light wavelengths) and excessive laser power causes damage to the composite substrate surface.

During the course of characterizing the mold-release material, secondary electrons generated in a scanning electron microscope from specimens with different surface preparations were found to be shielded from the detector by the presence of the mold-release on the surface. The mold release blocked the emission of electrons from the surface, as the mold release is a very good electrical insulator. In addition, the shielding effect was observed to be very effective even for a thin layer of mold release. These results indicate that electron emission from a composite surface can be used to sense the presence of mold release.

To develop a sensing system that was not constrained within the interior a scanning electron microscope, a system with an ultraviolet light to excite secondary electrons from a composite surface, a power supply to create a voltage to drive the liberated secondary electrons to a gold mesh pickup, and an ammeter to measure the amount of current generated was demonstrated. The system was able to discriminate between different surface conditions (cleanliness and activation) of the composite specimens.

Bonding surface preparation experiments were performed with double cantilever beam (DCB) tests demonstrating that the nondestructive secondary electron inspection method is able to relate a secondary electron based current (measure of cleanliness and surface activation) to mechanical strength.

Laser Ablation

The principal behind laser ablation is that a short laser pulse delivers energy to a surface at a very high heat flux and generates a plasma at the sample surface which quickly disappears. This process is very different from vaporizing molecules at the surface. Many cross-linked organic molecules do not have a vapor phase, meaning that if no oxygen is present, the material is eventually converted to only carbon. If air (oxygen) is present, the material will burn rather than vaporize.

Work done by Weber at al. — "Minimum Damage in CFRP Laser Processing," *Physics Procedia* 12, 2011 (pp. 302-307) on the thermodynamics of laser ablation show that most of the laser light can be absorbed by the carbon fibers within an epoxy and below the composite surface. An illustration from that work in FIG. 1 illustrates the mechanisms involved. The illustration shows a laser beam directed onto a carbon fiber that can create a large sublimated material ablation plume as well as heat waves parallel to the fiber axis and heat waves perpendicular to the fiber axis.

This process can easily overheat the carbon fibers and will damage the surrounding epoxy matrix, meaning that the shortest possible laser pulse is the best option for removing mold release from the surface. The main conclusion from Weber et al. is that the heat from the pulse is conducted along the carbon fibers and then dispersed into the matrix.

Our work has confirmed that laser ablation can be very effective for removing mold release, but that visible laser wavelengths (400-700 nm) were ineffective. We have found that the near ultraviolet region closest to visable light, which includes wavelengths between 200 and 400 nm couples more strongly to common mold releases, like Frekote 44-NC, and removes it from a composite surface by creating a plasma, which then dissipates. For example our testing with a laser light wavelength of 355 nm using a Keynence laser marking system shows excellent results. This was determined experimentally to produce an increase in the bond strength. This type of marking system is fast and can be used to treat large-scale surfaces appropriate for the construction of airframes. With different wavelengths between 200 nm and 400 nm some experimentation will provide the best power settings.

The 355 nm pulsed laser system was used to clean a composite surface of mold release. The pulse width associated with this system is approximately 5 ns with a repetition rate in the kHz range, computer controlled steering mirrors, and dynamic focus to follow a surface.

Two different surfaces were tested with the 355 nm laser and test patterns were marked onto the surface using a series of pulses that varied in power across the test area. A number of other parameters can be varied, such as focal spot size, spot density, writing speed, etc., but these were kept at a fixed value for our experiments. The first test was performed as a demonstration to ensure that the laser system was capable of modifying the sample surfaces, and it showed a large area view of unidirectional composite marked with the 355 nm laser. The laser's <5 ns pulse is focused to a 20 μm spot size. Also small white dots appeared which are the points where the laser light interacts with the surface. The damaged areas are caused by laser heating of the carbon fibers below the surface. In areas where the epoxy is thin, the heat is sufficient to cause an "explosion", which is most likely a brittle failure of the epoxy surface. The broken surface is then ejected by a small amount of internally generated gas, or is removed from the surface due to the handling of the sample afterwards. The area which experienced this "explosion" corresponded to the end of the test pattern and experienced the highest power level and heat flux. This suggests that the failure was the result of excessive laser power, which caused the surface damage. The area that was exposed to the laser light appeared to be bleached white in these experiments. This color change is thought to be due to debonding of the epoxy matrix from the underlying carbon fibers, causing two new surface interfaces to be created. The addition of the second surface interface increases the light that is reflected in the microscope, resulting in a "lighter" visual appearance for this area. To activate the epoxy surface for bonding without damaging either the surface or the near surface underneath, a significantly lower power exposure is required.

Additional experiments were then conducted to further characterize the capabilities of the 355 nm pulsed laser system. It was determined that the laser wavelength of 355 nm does couple to the Frekote mold release compound (meaning that the mold release is not transparent to the laser light at this wavelength). However, the layer of Frekote on the surface is thin, meaning it only absorbs a fraction of the incident laser light and the majority of the radiation travels through the epoxy (which is transparent to the 355 nm laser light) and heats the carbon fibers below the surface. This heating causes the epoxy to debond from the carbon fibers. The debonding appears as a "lighter" area due to the microscope light being reflected back to the microscope from the multiple surfaces created by the epoxy disbanding from the carbon tows.

The areas that exhibit delamination occur where the epoxy layer is thinnest over the carbon fibers as a result of a coarse surface provided by a polyester peel ply. In addition, the ridges on the surface are observed to have two different orientations. In the areas that exhibit white spots, the ridges are parallel to the carbon fibers below. In the other areas, the ridges are oriented perpendicular to the carbon fibers. A combination of diffraction, refraction, and scattering means that the laser beam becomes more focused upon reaching the carbon fibers in some areas, and less so in others. This results in uneven results where the 40% power setting is shown to be at the edge of the damage threshold. Ideally, the laser system would use as much power as possible to maximize the removal of mold release without damaging the composite. Testing with the Keynence laser marking system showed that the optimal power setting is approximately 30% of the maximum laser power (0.6 W). With different wavelengths between 200 nm and 400 nm some experimentation will provide the best settings. With other near ultraviolet pulsed laser systems the best combination of power settings can be found with straightforward testing.

To better examine the effects of using a near ultraviolet pulsed laser as a tool to remove the mold release from a substrate that would not be so easily damaged, a coating of mold release was deposited on a 6061-T6 Al sheet and exposed to the Keynence laser marking system (the Al alloy does not absorb laser light, but reflects it). The Al alloy has a high thermal conductivity (~152 W/m*K), meaning that the sheet surface will not heat and any mold release removal will be exclusively due to the molecules being converted to plasma as a result of interactions with the laser pulse. In addition, as the Al alloy is electrically conductive, the results of the marking process can be observed in a scanning electron microscope (SEM). This experiment provided insight into the coupling of the laser light to the mold release molecule, by showing the pattern created by the laser marking system in the SEM using secondary electrons emitted from the sample surface. There was a bright glow due to the mold release compound blocking the emission of secondary electrons everywhere except the locations the laser marked the surface. Since the film has been thinned by ablation of the coating, many more electrons reach the SEM's detector. Microscopic examination of a single laser mark pit, also showed that the film is more than a micron thick. Recast Frekote 44-NC around the edges was clearly visible, as well as some particles that have rained down on adjacent areas. The width of the bottom of the pits is ~20 microns, which is the diameter of the laser beam. From these results, it can be concluded that near ultraviolet wavelengths couple well to the mold release molecule. The center of the pit is brighter in the image, as the film is thinner here, resulting in a greater number of secondary electrons reaching the SEM's detector. In addition, the depth of the pit was measured with an atomic force microscope (AFM), and measured as ~1 micron.

The experiment was repeated with another 6061-T6 Al surface coated with drop cast diluted Frekote 44-NC (35:1 solvent to mold release by volume). The surface was marked at a lower power than in the previous surfaces. The same marking parameters (power and pulse time), were used to activate the unidirectional composite surface for DCB testing. Again, large numbers of more secondary electrons are emitted from the surface. The results indicate that the Frekote 44-NC is mobile on the Al surface. This is not unexpected, as the mold release is designed to evenly coat metal mold surfaces to facilitate its easy release from a composite component. There was however a net flow of 44-NC from the un-ablated areas towards the areas where ablation occurred. This is not what is expected for a classic recast. It is believed that when the laser pulse initiates, a plasma forms, quickly expands, and travels upwards from the surface. The outflow of material creates a vacuum at the base of the plasma plume near the surface. This pressure differential draws the 44-NC in from surrounding areas near the plasma. When the pulse terminates, the flow quickly freezes. The width of the ring is 17 microns, even though the width of the beam is 20 microns. This results in a tall rim around the area where the laser interacts with the surface. These rings are not seen on the composite surface, likely because the 44-NC is more mobile on the Al alloy surface.

Detection of Secondary Electrons

The detection of mold release compound on the surface of a composite is necessary to ensure bond quality. The first method examined for this was examination of the IR spectra of the specimen surfaces. Upon examination, the IR spectra of a surface contaminated with diluted Frekote 44-NC (35:1 solvent to 44-NC) was shown to be complicated by the background spectra of the epoxy substrate; the signals are almost identical, as the signal from the epoxy substrate dominates in both cases.

Raman spectroscopy was also examined as a method to detect the presence of mold release. The results indicate the epoxy spectral lines are much wider than that of the Frekote NC-44, completely masking any signal of its presence on the surface. The epoxy substrate is much thicker than the thin layer of mold release on the surface (the epoxy is several microns thick, whereas the mold release is tens of nanometers thick). In order for spectroscopy to work as a functional NDE method to test for the presence of a contaminant, there must be a spectral line that is unique to the mold release, which is not the case for compounds examined here.

Results from both Raman and IR spectrographic measurements indicate that the background spectra from the epoxy matrix dominate, and the spectra from the mold release is difficult to distinguish from the background. This indicates that spectrographic methods will not be suitable to accurately measure the removal of mold release compound.

Another option is the detection of secondary electrons. Secondary electron detection, as discussed above, is usually performed as part of experiments with a scanning electron microscope (SEM). Secondary electrons are generated at or near the surfaces of materials as a result of an ionization process from interaction with a radiation source (ions, electrons, or photons of sufficiently high energy). In this case, secondary electrons were investigated for feasibility in determining the state of surface contamination.

During laser ablation experiments, the results from a 355 nm pulsed laser exhibited a clear increase in the secondary electron emissions from the surface. Unfortunately, this measurement can only be taken inside the chamber of an SEM. We then devised experiments to determine if photoelectric emission of secondary electrons from these composite surfaces could be measured in a fashion similar to measurements that have been recently reported by groups at NASA. The NASA groups reported significant changes in secondary electron signals after laser ablation of both neat and contaminated (with mold release) surfaces.

Secondary electrons are emitted by a clean and/or activated surface through interactions with a radiation source and the composite material. Within the composite, electrons held covalently within the epoxy bonds would be liberated by photons from the radiation source. These electrons would then become available for detection. This process is different than for a metal where free electrons are readily available to be scattered off the surface if exposed to a radiation source. When a surface is contaminated with mold release, the amount of liberated secondary electrons significantly decreases. The actual mechanism behind the decrease in secondary electrons is still unclear, although there is more than one possible explanation. One possibility is that the mold release strongly absorbs the UV light and prevents it from reaching the epoxy surface. Another is that electrons are being generated, but the mold release, being a good insulated, prevents the electrons from escaping from the surface.

Figure 2:
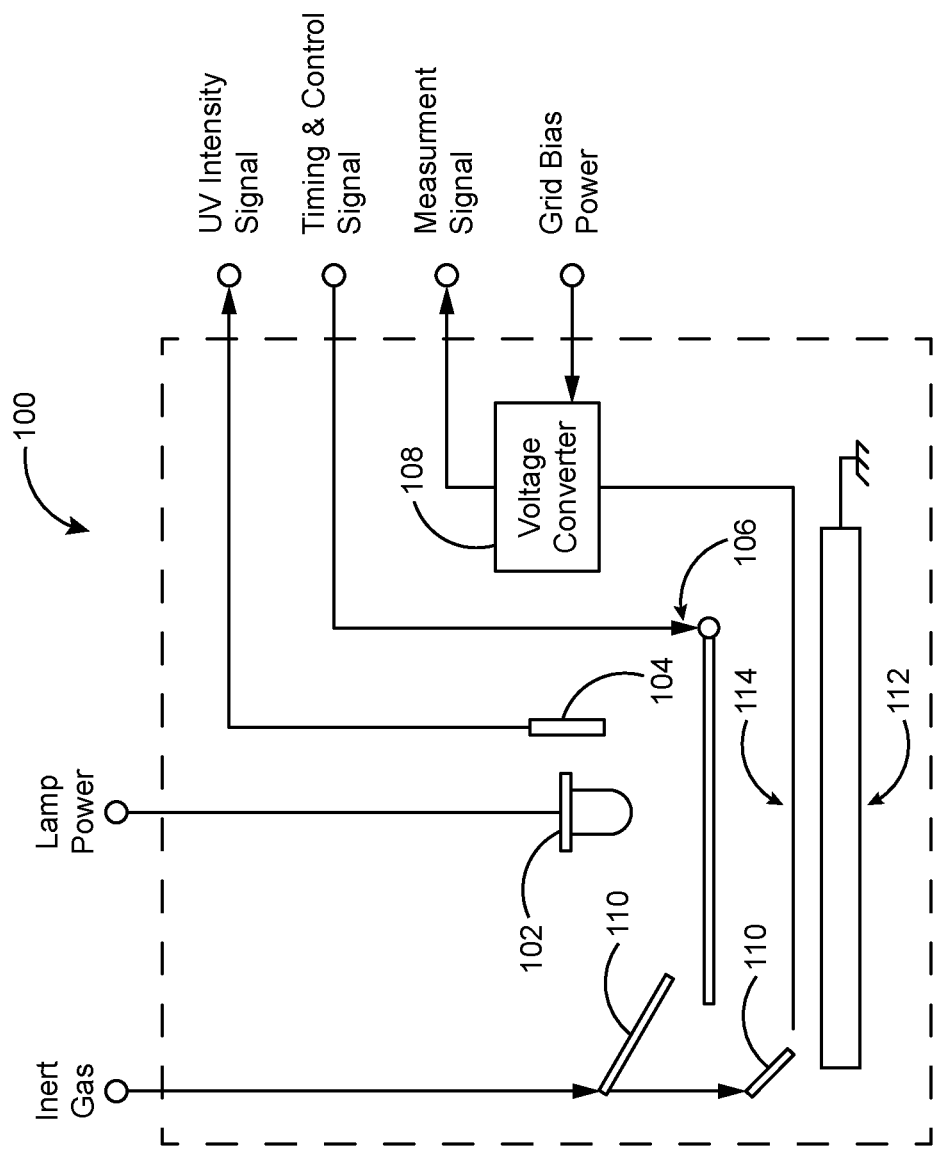
FIG. 2 Prior art (NASA) utilizing optically stimulated emission measurement device.

Prior art approaches published by NASA investigators and others have disclosed experimental systems, instruments, and devices that can be used to characterize levels of surface contaminates from photo-induced emission analysis. FIG. 2 (prior art) from U.S. Pat. No. 10,302,556 by Yost, et al issued in May 28, 2019 describes an optically stimulated electron emission (OSEE) measurement device, shown generally as 100 utilizing one or more lamp(s) 102, one or more purge gas nozzle(s) 110, a shutter 106, a voltage converter 108, a grid 114, and a sample holder supporting a sample 112.

The Yost system uses light from lamp 102 to radiate a composite surface sample and an electrically biased grid 114, acting as a collector, then collects emitted electrons and ions from the sample 112 when it is illuminated by the lamp 102 and opening of the shutter 106.

Laboratory systems of this type usually require an inert gas, supplied by the two shown gas nozzles 110.

Initial experiments using a SEM were performed to validate examinations of laser ablation of the composite surface to activate it (which are discussed later). The results of these examinations showed significant increases in the secondary electron emission as the surface became more activated. Unfortunately, as this was performed in an SEM, the sample sizes were small and the methods needed to be transitioned outside of an SEM in order to be viable in a manufacturing environment.

Leaving the Scanning Electron Microscope (SEM)

Figure 3:
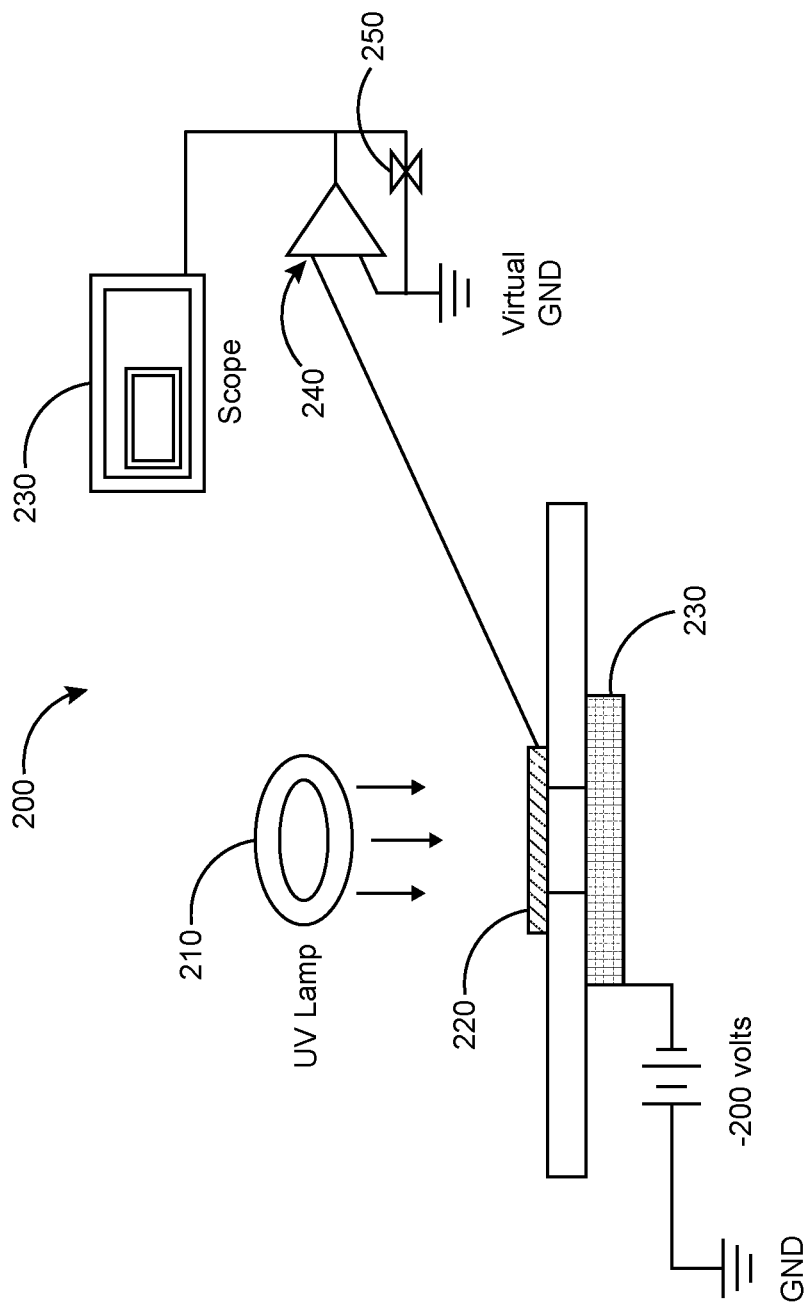
FIG. 3 The approach of this disclosure utilizing photoelectric secondary electronic detection with other embodiments.

To perform this measurement outside of an SEM, a breadboard prototype sensor, is illustrated generally as 200 in FIG. 3 was constructed. Referring now to FIG. 3, the sensor used a UV lamp (185 nm) 210 as a radiation source. This provides a compromise between using higher frequency radiation sources (which innately have greater energy but can more quickly damage the epoxy in the composite) and lower frequency sources (which do not have the necessary energy to generate sufficient numbers of secondary electrons for detection). Importantly, the composite sample 230 to be irradiated was biased using a −200 V DC power supply with respect to ground. By biasing the sample and holding the collector at ground, electronic artifacts, such as shot noise, are avoided. We have found that OSEE electrons from composite surfaces begin to be generated in large numbers once the wavelength drops below 200 nm and generally more electrons are ejected from the surface as we decrease the wavelength. 185 nm light is available from mercury plasma lamps and 160 nm light from deuterium plasma.

A gold (Au) mesh 220 is used as an electron collector connected to a trans-impedance amplifier 240 and a feedback resistor 250. This combination provides a virtual ground to the circuit. Gold was used since its surface does not develop an oxide layer in the presence of oxygen to permit measurements in standard atmospheric conditions and not require the presence of a non-reactive gas (such as argon (Ar) over the sensor. This setup was in turn connected to an ammeter 230 to measure the current flow. In this way, secondary electrons can be used as an effective inspection method to determine if a surface is contaminated and measure the surface activation itself. Note that if a user wanted to use a mesh 220 different than gold this could be accommodated by providing the secondary electron sensing systems in an inert atmosphere.

Items of note regarding this setup are as follows: A gold foil or mesh 220 was used as the pickup electrode. As mentioned, gold was chosen since it does not oxidize, which would create an insulating film on the surface that would inhibit electron detection. Other metal systems that do not oxidize should also work.

The technique is described as follows. Rather than bias the detector, as many systems do, the collector is connected to a very high gain current trans-impedance amplifier 240, which holds the collector 220 at virtual ground. A virtual ground is a node of a circuit that is maintained at a steady reference potential without being directly connected to the reference potential.

In further testing, secondary electron generated currents for three different specimen surface situations were measured: a null test (using unidirectional composite with no Frekote on the surface—neat condition), an ablated unidirectional test with no Frekote on the surface and an ablated unidirectional test that was previously coated with diluted 44-NC. Prior to controlled contamination and testing, all the composite specimens were cleaned with a horsehair brush to remove any gross contaminants on the surface. During testing, the composite surface was exposed to the UV light and the generated photocurrents were recorded using an oscilloscope. A negative current is generated when the light is activated. For the unidirectional, neat specimen, an initial pulse peak of ~50 pA was reached before decreasing to a steady state value of ~20 pA over 5 sec. When the UV light is turned off (after ~20 sec), the current returns to zero. When the UV light was reactivated after ~30 seconds, the current returned to the steady state value with no substantial initial pulse.

In preparation for double cantilever beam (DCB) testing, two laser ablated samples were examined. For these ablated samples, the initial current is much larger due to a much larger area of freshly exposed epoxy surface. The steady state current for the first specimen was ~130 pA, almost an order of magnitude higher than a reference wire brushed specimen. The second laser ablated sample exhibited similar results despite the surface of that sample being coated with diluted 44-NC prior to ablation (corresponding to a steady state current of ~110 pA).

In addition, to ensure that the current being produced was not being caused by an electronic induction between the lamp/power supply, a shutter was used to physically block any extraneous light. Results from this test indicate that there is no detectable inductive current from the lamp, and the current is indeed a photo-induced current.

As a final confirmation check of this method, standard Al foil was placed in the detector (in place of the composite specimen) to examine the effects from a metal known to produce strong photo-electric currents. As expected, the secondary electron generated current is an order of magnitude higher than observed for the composite specimens and no initial current pulse is observed. Instead, the current increases with time. Then, a thin coat of 44-NC was added to the Al foil surface, which was shown to dramatically decrease the produced current. These tests indicate that secondary electron currents are a strong indicator for the presence or absence of mold release.

From these results, we see that photoelectric secondary electron generated currents are an excellent candidate for a sensitive test that can be used to discriminate between a number of different surface conditions.

DCB Confirmation

Bonding surface preparation experiments were performed with double cantilever beam (DCB) tests that demonstrated that the nondestructive secondary electron inspection method is able to relate a secondary electron based current (measure of cleanliness and surface activation) to mechanical strength.

CONCLUSIONS

In this disclosure, two different techniques were successfully demonstrated to improve the bond strength in composite joints and to inspect that the surfaces to be bonded are properly cleaned and activated to assure good bonding. Pulsed laser ablation using near ultraviolet pulsed laser wavelengths was used to both prepare and clean composite surfaces. This approach offers a controlled means to activate the surface, which is better than merely roughening the surface with sandpaper or wire brushing. Also, surfaces that have been contaminated with mold-release can be cleaned, as the laser first ablates the mold-release from the surface and subsequently activates it. After this, a sensing system uses short wave UV light (185 nm) to generate secondary electrons from the composite surface, which in turn generates a measurable current that is directly proportional to the cleanliness and activation of the surface. These nondestructive evaluation (NDE) results were experimentally found to directly correlate to results from mechanical testing of the bond strength using double cantilever beam (DCB) testing.

The findings of this work can be utilized in a number of different embodiments in order to provide the goal of having a manufacturing system that is a combination of a cleaning system, to remove any traces of mold release, and an inspection system to determine if there is any remaining contamination, in particular mold release, present on the composite surfaces. The inspection would also provide information on the state of the activation of the surface so that the cleaning system could then remove the remaining contamination from the surface. Subsequently, the surface could be inspected again to ensure that the procedure had been performed correctly and the surfaces were ready for bonding. Currently no system exists that can perform all of these needs in a manufacturing environment.

In one embodiment, the manufacturing system would be an integrated laser ablation and inspection device, combining a pulsed near ultraviolet laser marking device with the non-destructive inspection system as described herein and illustrated in FIG. 3.

In another embodiment, the necessary technology for surface activation/inspection would be produced and used separately but in conjunction with a commercially available pulsed laser ablation system.

In another embodiment, the surface activation/inspection technology would be used in conjunction with inert gas purges allowing different types of grid electron collectors.

Although certain embodiments and their advantages have been described herein in detail, it should be understood that various changes, substitutions and alterations could be made without departing from the coverage. Moreover, the potential applications of the disclosed techniques are not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized.

What we claim is:

1. An integrated nondestructive sensing device for inspection and measuring the cleanliness of composite surfaces coupled with laser ablation for removing contaminants and activating the composite surfaces comprising:
   a. a pulsed laser ablation system to prepare and clean the composite surfaces;
   b. a secondary electron sensing system using a short wave ultraviolet light to generate secondary electrons from the composite surfaces to generate a measurable current that is directly proportional to the cleanliness and activation of the surface;
   c. wherein the secondary electrons are collected via a mesh collector connected to a virtual ground and the secondary electron current is measured by an ammeter; and
   d. wherein the composites surfaces are biased to ground with a negative DC power supply.

2. The integrated nondestructive sensing device for inspection and measuring the cleanliness of composite surfaces coupled with laser ablation for removing contaminants and activating the composite surfaces of claim 1 wherein the pulsed laser ablation system encompasses laser wavelengths between 200 and 400 nm.

3. The integrated nondestructive sensing device for inspection and measuring the cleanliness of composite surfaces coupled with laser ablation for removing contaminants and activating the composite surfaces of claim 1 wherein the secondary electron sensing system using a short wave ultraviolet light to generate secondary electrons from the composite surfaces utilizes ultraviolet light sources between 160 nm and 200 nm.

4. The integrated nondestructive sensing device for inspection and measuring the cleanliness of composite surfaces coupled with laser ablation for removing contaminants and activating the composite surfaces of claim 1 wherein the virtual ground for the mesh collector is created via a trans-impedance amplifier with at least one feedback resistor.

5. The integrated nondestructive sensing device for inspection and measuring the cleanliness of composite surfaces coupled with laser ablation for removing contaminants and activating the composite surfaces of claim 1 wherein the composites surfaces are biased to ground with a negative DC power supply between −100 and −500 volts.

6. The integrated nondestructive sensing device for inspection and measuring the cleanliness of composite surfaces coupled with laser ablation for removing contaminants and activating the composite surfaces of claim 1 wherein the provided mesh collector is made from gold.

7. An integrated nondestructive sensing method for inspection and measuring the cleanliness of composite surfaces coupled with a laser ablation method for removing contaminants and activating the composite surfaces comprising:
- e. providing a pulsed laser system and using it to prepare and clean the composite surfaces;
- f. providing a secondary electron sensing system using a short wave ultraviolet light to generate secondary electrons from the composite surfaces to generate a measurable current that is directly proportional to the cleanliness and activation of the surface;
- g. collecting the generated secondary electrons with a mesh collector connected to a virtual ground;
- h. measuring the secondary electron current with an ammeter; and
- i. biasing the composite surfaces to ground with a negative DC power supply.

8. The integrated nondestructive sensing method for inspection and measuring the cleanliness of composite surfaces coupled with a laser ablation method for removing contaminants and activating the composite surfaces of claim 7 wherein the provided pulsed laser ablation system encompasses laser wavelengths between 200 and 400 nm.

9. The integrated nondestructive sensing method for inspection and measuring the cleanliness of composite surfaces coupled with a laser ablation method for removing contaminants and activating the composite surfaces of claim 7 wherein the provided secondary electron sensing system using a short wave ultraviolet light to generate secondary electrons from the composite surfaces utilizes ultraviolet light sources between 160 nm and 200 nm.

10. The integrated nondestructive sensing method for inspection and measuring the cleanliness of composite surfaces coupled with a laser ablation method for removing contaminants and activating the composite surfaces of claim 7 wherein the provided virtual ground for the mesh collector is created via a trans-impedance amplifier with at least one feedback resistor.

11. The integrated nondestructive sensing method for inspection and measuring the cleanliness of composite surfaces coupled with a laser ablation method for removing contaminants and activating the composite surfaces of claim 7 wherein the composites surfaces are biased to ground with a negative DC power supply between −100 and −500 volts.

12. The integrated nondestructive sensing method for inspection and measuring the cleanliness of composite surfaces coupled with a laser ablation method for removing contaminants and activating the composite surfaces of claim 7 wherein the provided mesh collector is made from gold.

13. A nondestructive sensing device for inspection and measuring the cleanliness of composite surfaces comprising:
- a. a secondary electron sensing system using a short wave ultraviolet light to generate secondary electrons from the composite surfaces to generate a measurable current that is directly proportional to the cleanliness and activation of the surface;
- b. wherein the secondary electrons are collected via a mesh collector connected to a virtual ground and the secondary electron current is measured by an ammeter; and
- c. wherein the composites surfaces are biased to ground with a negative DC power supply.

14. The nondestructive sensing device for inspection and measuring the cleanliness of composite surfaces of claim 13 wherein the secondary electron sensing system using a short wave ultraviolet light to generate secondary electrons from the composite surfaces utilizes ultraviolet light sources between 160 nm and 200 nm.

15. The nondestructive sensing device for inspection and measuring the cleanliness of composite surfaces of claim 13 wherein the virtual ground for the mesh collector is created via a trans-impedance amplifier with at least one feedback resistor.

16. The nondestructive sensing device for inspection and measuring the cleanliness of composite surfaces of claim 13 wherein the composites surfaces are biased to ground with a negative DC power supply between −100 and −500 volts.

17. The nondestructive sensing device for inspection and measuring the cleanliness of composite surfaces of claim 13 wherein the mesh collector is made from gold.

18. A nondestructive sensing method for inspection and measuring the cleanliness of composite surfaces comprising:
- a. providing a secondary electron sensing system using a short wave ultraviolet light to generate secondary electrons from the composite surfaces to generate a measurable current that is directly proportional to the cleanliness and activation of the surface;
- b. collecting the generated secondary electrons with a mesh collector connected to a virtual ground;
- c. measuring the secondary electron current with an ammeter; and
- d. biasing the composite surfaces to ground with a negative DC power supply.

19. The nondestructive sensing method for inspection and measuring the cleanliness of composite surfaces of claim 18 wherein the provided secondary electron sensing system using a short wave ultraviolet light to generate secondary electrons from the composite surfaces utilizes ultraviolet light sources between 160 nm and 200 nm.

20. The nondestructive sensing method for inspection and measuring the cleanliness of composite surfaces of claim 18 wherein the virtual ground for the mesh collector is created via a trans-impedance amplifier with at least one feedback resistor.

21. The nondestructive sensing method for inspection and measuring the cleanliness of composite surfaces of claim 18 wherein the composites surfaces are biased to ground with a negative DC power supply between −100 and −500 volts.

22. The nondestructive sensing method for inspection and measuring the cleanliness of composite surfaces of claim 18 wherein the mesh collector is made from gold.

\* \* \* \* \*